United States Patent
Toma et al.

(10) Patent No.: US 8,018,680 B2
(45) Date of Patent: *Sep. 13, 2011

(54) VERTICAL MAGNETIC RECORDING HEAD DEVICE WITH THE RETURN YOKE LAYER HAVING THICK PORTIONS

(75) Inventors: Yusuke Toma, Niigata-ken (JP); Hiroshi Kameda, Niigata-ken (JP); Kiyoshi Kobayashi, Niigata-ken (JP); Toru Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 904 days.

This patent is subject to a terminal disclaimer.

(21) Appl. No.: 11/947,148

(22) Filed: Nov. 29, 2007

(65) Prior Publication Data
US 2008/0152951 A1    Jun. 26, 2008

(30) Foreign Application Priority Data

Dec. 26, 2006  (JP) ................................. 2006-349329

(51) Int. Cl.
*G11B 5/147*  (2006.01)
*G11B 5/39*  (2006.01)

(52) U.S. Cl. .............................. 360/125.19; 360/125.21

(58) Field of Classification Search ............. 360/125.16, 360/125.19, 125.2, 125.21, 125.26
See application file for complete search history.

(56) References Cited

U.S. PATENT DOCUMENTS

| | | | |
|---|---|---|---|
| 2004/0240108 A1* | 12/2004 | Shukh ........................... | 360/125 |
| 2005/0083608 A1 | 4/2005 | Watanabe | |
| 2006/0256472 A1* | 11/2006 | Hirabayashi et al. ......... | 360/126 |
| 2008/0019042 A1* | 1/2008 | Toma et al. ................... | 360/110 |

FOREIGN PATENT DOCUMENTS

| | | |
|---|---|---|
| GB | 2 407 201 A | 4/2005 |
| JP | 2005-122831 | 5/2005 |

* cited by examiner

*Primary Examiner* — Jefferson Evans
(74) *Attorney, Agent, or Firm* — Brinks Hofer Gilson & Lione (57) ABSTRACT

A vertical magnetic recording head device includes: a magnetic layer that includes a main magnetic pole exposed from a surface facing a recording medium; a return yoke layer that is provided on the magnetic layer with a non-magnetic layer interposed therebetween; and coil layers that apply a recording magnetic field to the magnetic layer and the return yoke layer. In the vertical magnetic recording head device, the return yoke layer includes thick portions that extend in a height direction in edge regions arranged in a track width direction.

2 Claims, 6 Drawing Sheets

VERTICAL MAGNETIC RECORDING HEAD DEVICE WITH THE RETURN YOKE LAYER HAVING THICK PORTIONS

CLAIM OF PRIORITY

This application claims benefit of the Japanese Patent Application No. 2006-349329 filed on Dec. 26, 2006, the entire content of which is hereby incorporated by reference.

BACKGROUND OF THE INVENTION

1. Field of the Invention

The present invention relates to a vertical magnetic recording head device that applies a magnetic field to the surface of a recording medium in a vertical direction to record information on the recording medium.

2. Description of the Related Art

Vertical magnetic recording head devices have a laminated structure in which a return yoke layer is provided on a main magnetic pole layer, with a non-magnetic insulating layer interposed therebetween, in a surface facing a recording medium. The main magnetic pole layer and the return yoke layer are magnetically connected to each other at a position that is recessed from the surface facing a recording medium in the height direction. In addition, coil layers for applying a recording magnetic field to the main magnetic pole layer and the return yoke layer are provided in the non-magnetic insulating layer. In the magnetic head device having the above-mentioned structure, when a current flows through the coil layers, a recording magnetic field is formed between the main magnetic pole layer and the return yoke layer, and the recording magnetic field is vertically applied to a hard film of a recording medium from the surface of the main magnetic pole layer facing the recording medium to reach a soft film of the recording medium. Then, the recording magnetic field returns to the return yoke layer. In this way, information is recorded in a region of the recording medium facing the main magnetic pole layer (see JP-A-2005-122831).

In the vertical magnetic recording head device, the return yoke layer or a shield layer is generally formed of a substantially rectangular thin film magnetic body. When an external magnetic field is applied in the height direction, the magnetic flux in the magnetic body is concentrated on the edge of the thin film. In this case, the number of magnetization components in the height direction is the largest, which causes the overwriting of information (edge write). That is, in order to weaken an edge write magnetic field, it is necessary to reduce magnetic field components generated from the edge of the return yoke layer or the shield layer in the height direction.

SUMMARY

According to an aspect of the invention, a vertical magnetic recording head device includes: a first magnetic layer that includes a main magnetic pole exposed from a surface facing a recording medium; a second magnetic layer that is provided on the first magnetic layer with a non-magnetic layer interposed therebetween; and a coil layer that applies a recording magnetic field to the first magnetic layer. In the vertical magnetic recording head device, the second magnetic layer includes thick portions that extend in a height direction in edge regions arranged in a track width direction.

According to the above-mentioned structure, the second magnetic layer includes the thick portions that extend in the height direction in the edge regions arranged in the track width direction. The edge of the thick portion exposed from the surface facing a recording medium has a relatively large area. The magnetic field density in the vicinity of the thick portion is lowered, and the intensity of the magnetic field generated from the thick portion is lowered. Therefore, the second magnetic layer having a relatively small thickness makes it possible to weaken the edge write magnetic field and thus to improve resistance to an external magnetic field.

In the vertical magnetic recording head device according to the above-mentioned aspect, preferably, the thick portions are provided at positions exposed from the surface facing the recording medium. Further, in the vertical magnetic recording head device according to the above-mentioned aspect, preferably, the width of the thick portion in the track width direction is in a range of about 4 μm to about 10 μm.

As described above, according to an embodiment of the invention, a vertical magnetic recording head device includes: a first magnetic layer that includes a main magnetic pole exposed from a surface facing a recording medium; a second magnetic layer that is provided on the first magnetic layer with a non-magnetic layer interposed therebetween; and a coil layer that applies a recording magnetic field to the first magnetic layer. In the vertical magnetic recording head device, the second magnetic layer includes thick portions that extend in a height direction in edge regions arranged in a track width direction. According to the above-mentioned structure, it is possible to weaken an edge write magnetic field and thus improve resistance to an external magnetic field.

DESCRIPTION OF THE EMBODIMENTS

Hereinafter, exemplary embodiments of the invention will be described in detail with reference to the accompanying drawings.

In this embodiment, a second magnetic layer is a return yoke layer.

In a vertical magnetic recording head device, when the internal temperature increases during the recording of information, the return yoke layer is likely to protrude from a surface facing a recording medium due to the difference between a thermal expansion coefficient of a material forming the return yoke layer and a thermal expansion coefficient of an insulating material formed in the periphery of the return yoke layer, which is called a PTP (pole tip protrusion) phenomenon.

The inventors found that it is possible to prevent the PTP phenomenon by reducing the thickness of the return yoke layer. However, when the thickness of the return yoke layer is reduced in order to prevent the PTP phenomenon and thus the area of a portion of the return yoke layer exposed from the surface facing a recording medium is reduced, the return yoke layer is likely to be magnetized in the height direction, and the magnetic field intensity in the height direction is strengthened, which results in an edge write magnetic field. Therefore, an object of the disclosure is to provide a technique for preventing the PTP phenomenon, lowering the edge write magnetic field, and improving resistance to an external magnetic field.

That is, an embodiment of the disclosure provides a vertical magnetic recording head device including: a first magnetic layer having a main magnetic pole that is exposed from a surface facing a recording medium; a second magnetic layer that is provided on the first magnetic layer with a non-magnetic layer interposed therebetween; and a coil layer that applies a recording magnetic field to the first magnetic layer. The second magnetic layer has thick portions that extend in the height direction in edge regions provided in a track width direction. According to the above-mentioned structure, it is possible to prevent the PTP phenomenon, lower an edge write magnetic field, and improve resistance to an external magnetic field.

Figure 1:
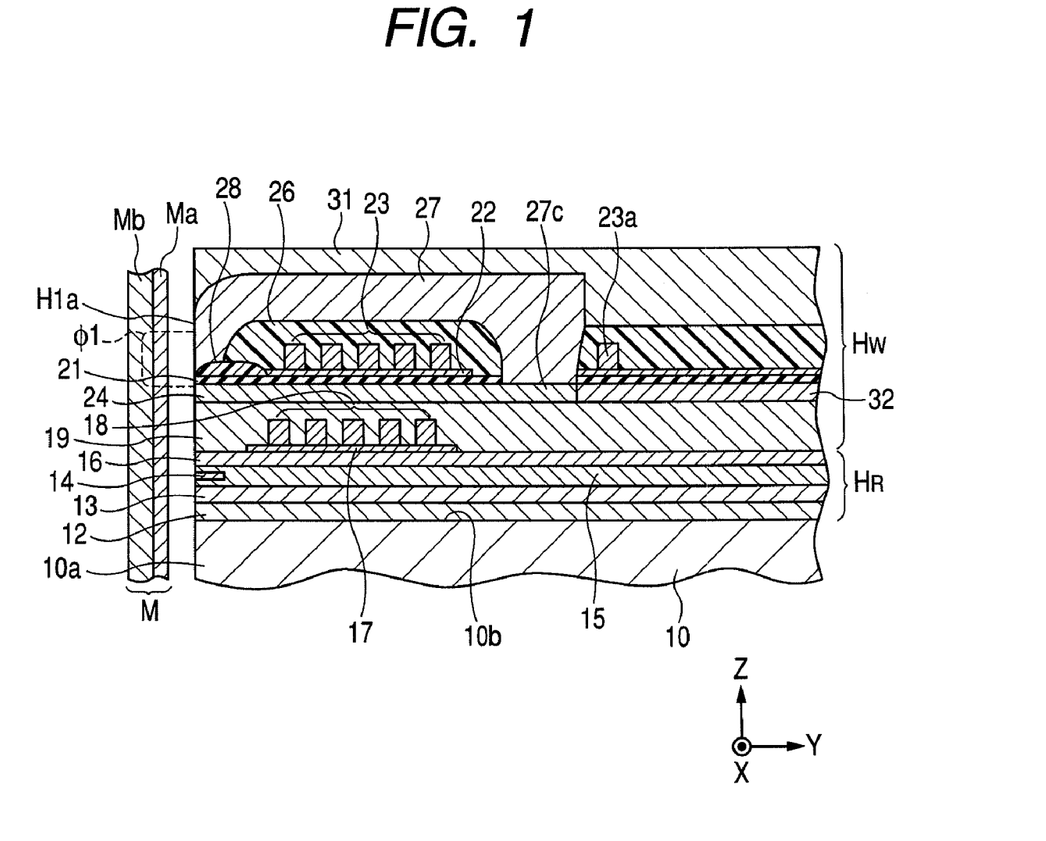
FIG. 1 is a longitudinal cross-sectional view illustrating a magnetic head provided with a vertical magnetic recording head according to an embodiment of the disclosure.
Figure 2:
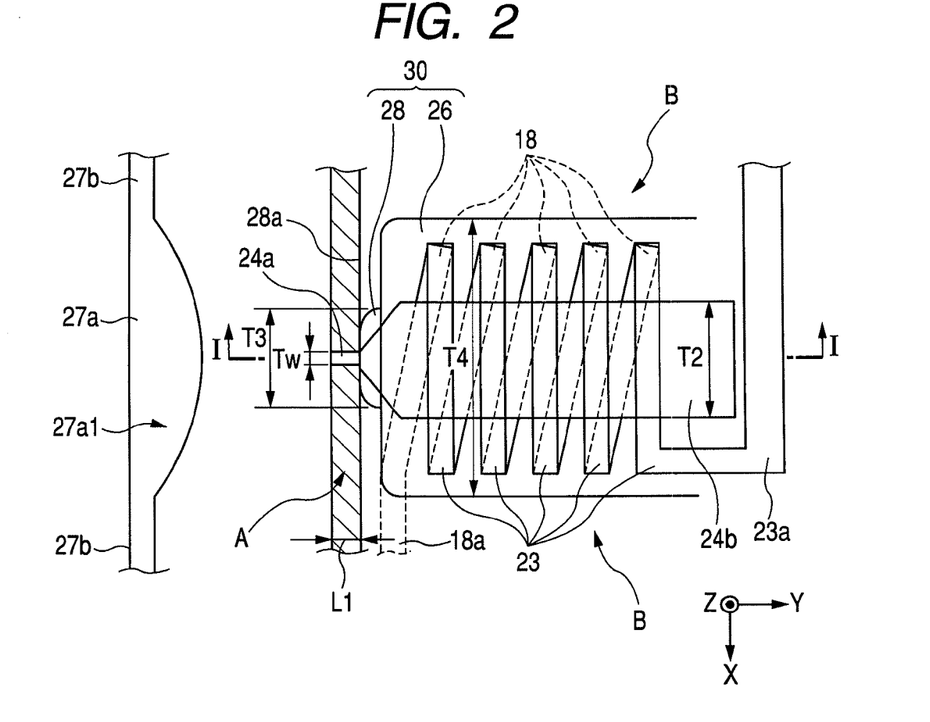
FIG. 2 is a partial plan view illustrating the vertical magnetic recording head shown in FIG. 1 and a partial front view illustrating a return yoke layer.

FIG. 1 is a longitudinal cross-sectional view illustrating a magnetic head including a vertical magnetic recording head according to an embodiment of the disclosure. FIG. 2 is a partial plan view of the vertical magnetic recording head shown in FIG. 1 and a partial front view of the return yoke layer. In FIG. 1, an X-axis direction indicates a track width direction, a Y-axis direction indicates a height direction, and a Z-axis direction indicates a thickness direction. The X-axis, Y-axis, and Z-axis directions are orthogonal to one another.

In this embodiment, a magnetic layer having a slit serves as the return yoke layer.

A vertical magnetic recording head $H_W$ shown in FIG. 1 applies a vertical magnetic field to a recording medium M to magnetize a hard film Ma of the recording medium M in the vertical direction. The recording medium M has, for example, a discoid shape, and has the hard film Ma with high residual magnetization on the outer surface and a soft film Mb having high magnetic permeability below the hard film Ma. The recording medium M rotates on the center of the disk.

A slider 10 is formed of a non-magnetic material, such as $Al_2O_3$ or TiC. One side surface 10a of the slider 10 faces the recording medium M. When the recording medium M rotates, the slider 10 is lifted from the surface of the recording medium M due to airflow on the surface, or the slider 10 slides on the recording medium M. A non-magnetic insulating layer 12 formed of an inorganic material, such as $Al_2O_3$ or $SiO_2$, is provided on a trailing surface (upper surface) 10b of the slider 10, and a read portion $H_R$ is formed on the non-magnetic insulating layer 12.

The read portion $H_R$ includes a lower shield layer 13 formed on the non-magnetic insulating layer 12 and an upper shield layer 16 that is provided on the lower shield layer 13 with an inorganic insulating layer (gap insulating layer) 15 interposed therebetween. These shield layers 13 and 16 have larger widths than a main magnetic pole. A read element 14 is provided in the inorganic insulating layer 15. A magnetoresistive element, such as an AMR (anisotropic magnetoresistive) element, a GMR (giant magnetoresistive) element, or a TMR (tunnel magnetoresistive) element, is used as the read element 14.

A plurality of lower coil pieces 18 formed of a conductive material are formed on the upper shield layer 16 with a coil insulating base layer 17 interposed therebetween. The lower coil piece 18 is formed of at least one kind of metal material selected from, for example, Au, Ag, Pt, Cu, Cr, Al, Ti, NiP, Mo, Pd, Rh, and Ni. In addition, the lower coil piece 18 may be formed of a laminated structure of layers each formed of a non-magnetic metal material.

A coil insulating layer 19 formed of an inorganic insulating material, such as $Al_2O_3$, or an organic insulating material, such as resist, is provided in the periphery of the lower layer coil pieces 18. The upper surface of the coil insulating layer 19 is planarized, and a seed layer (not shown) is formed on the planarized surface of the coil insulating layer 19. A main magnetic pole layer 24 is formed on the seed layer. The periphery of the main magnetic pole layer 24 is covered with an insulating layer 32 formed of an insulating material, such as $Al_2O_3$ or $SiO_2$, and a planarizing process is performed such that an upper surface of the main magnetic pole layer 24 is flush with an upper surface of the insulating layer 32. The main magnetic pole layer 24 is formed of a ferromagnetic material having high saturation magnetic flux density, such as NiFe, CoFe, or NiFeCo by, for example, plating.

As shown in FIG. 2, the main magnetic pole layer 24 includes an elongated front portion 24a with a track width Tw that is formed in the height direction (in the Y-axis direction in FIG. 2) from a surface H1a facing the recording medium (the surface H1a and the surface 10a of the slider 10 are formed substantially on the same plane), and a rear portion 24b (maximum width T2) that is formed at the rear side of the front portion 24a in the height direction so as to have a larger width than the front portion 24a in the track width direction (in the X-axis direction in FIG. 2).

As shown in FIG. 1, a gap layer 21, which is a non-magnetic layer formed of an inorganic material, such as $Al_2O_3$ or $SiO_2$, is provided on the main magnetic pole layer 24. Upper coil pieces 23 are formed on the gap layer 21 with a coil insulating base layer 22 interposed therebetween. Since the gap layer 21 also serves as an insulating base layer of the upper coil pieces 23, the coil insulating base layer 22 may not be formed. The upper coil pieces 23 are formed of a conductive material, similar to the lower coil pieces 18. The upper coil pieces 23 is formed of at least one kind of metal material selected from, for example, Au, Ag, Pt, Cu, Cr, Al, Ti, NiP, Mo, Pd, Rh, and Ni. In addition, the upper coil pieces 23 may be formed by laminating layers made of a non-magnetic metal material.

As shown in FIG. 2, the lower coil pieces 18 and the upper coil pieces 23 are arranged in a solenoid shape, and ends of the coil pieces in the track width direction (in the X-axis direction in FIG. 2) are electrically connected to each other. Lead portions 18a and 23a are formed in the lower coil pieces 18 and the upper coil pieces 23, respectively, and a current flows from the lead portions 18a and 23a to the solenoid coil.

A coil insulating layer 26 formed of an inorganic insulating material, such as $Al_2O_3$, or an organic insulating material, such as resist, is formed on the upper coil pieces 23. In this embodiment, a gap adjusting insulating layer 28 formed of an inorganic material or an organic material is provided on the gap layer 21. The front edge of the coil insulating layer 26 overlaps the gap adjusting insulating layer 28. As shown in FIG. 2, a front edge 28a of the gap adjusting insulating layer 28 linearly extends in a direction that is substantially parallel to the track width direction (the X-axis direction in FIG. 2). The front edge 28a of the gap adjusting insulating layer 28 is spaced from the surface H1a facing a recording medium by a predetermined distance (gap depth) L1 in the height direction. As shown in FIG. 2, the gap adjusting insulating layer 28 extends in the track width direction (the X-axis direction in FIG. 2). The width T3 of the front edge 28a of the gap adjusting insulating layer 28 is smaller than the maximum width T2 of the main magnetic pole layer 24.

When the solenoid-shaped coil layer is used, the width of the upper coil piece 23 in the track width direction is larger than the maximum width T2 of the main magnetic pole layer 24. Therefore, the maximum width T4 of the coil insulating layer 26 covering the upper coil pieces 23 is larger than the maximum width T2 of the main magnetic pole layer 24. The gap adjusting insulating layer 28 is formed of, for example, an organic insulating material by thermal hardening. The shape of the gap adjusting insulating layer 28 in a longitudinal cross section is changed from a rectangular shape to a substantially semiellipsoidal shape (or at least the upper surface is formed of a curved surface) by a heat treatment. The coil insulating layer 26 that extends in the height direction so as to partially overlap the gap adjusting insulating layer 28 is also formed of an organic insulating material by thermal hardening. The upper surface of the coil insulating layer 26 close to the surface facing a recording medium protrudes from the gap adjusting insulating layer 28 to have a curved surface. When the upper surface of the gap layer 21 is used as a reference surface, the gap adjusting insulating layer 28 and the coil insulating layer 26 (hereinafter, in some cases, the two layers are referred to as an 'insulating layer 30') protrude from the reference surface in the upward direction (the Z-axis direction in the drawings). The upper surface of the gap layer 21 is exposed in the periphery of the insulating layer 30. In the following description, a region between the front edge 28a of the gap adjusting insulating layer 28 and the surface H1a facing a recording medium is referred to as a front region A, and both regions of the insulating layer 30 in the track width direction (the X-axis direction in the drawings) are referred to as side regions B.

As shown in FIGS. 1 and 2, a return yoke layer 27, which is a second magnetic layer formed of a magnetic material, such as permalloy, is formed on the front region A, the insulating layer 30, and the side regions B. As shown in FIG. 1, a rear end of the return yoke layer 27 in the height direction serves as a connection portion 27c that is magnetically connected to the main magnetic pole layer 24. The return yoke layer 27 is covered with a protective layer 31 formed of, for example, an inorganic insulating material. In addition, the second magnetic layer may be composed of a layer that does not include the connecting portion 27c, that is, is not magnetically coupled to a magnetic layer having a main magnetic pole, but has only a shield function. The return yoke layer 27 has a larger width than the main magnetic pole.

Figure 3:
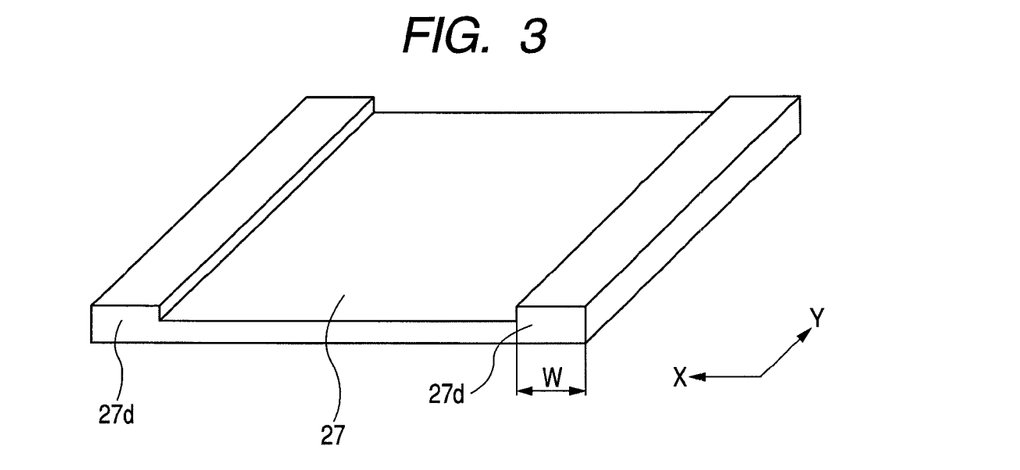
FIG. 3 is a diagram illustrating the shape of the return yoke layer.

The return yoke layer 27 includes thick portions 27d in the edge regions in the track width direction, and the thick portions 27d extends in the height direction. As shown in FIG. 3, the thick portion 27d is formed in a shape in which a region corresponding to the center of an element has a small thickness and the edge regions in the track width direction have a large thickness. In this case, the thick portions make it possible to increase the area of a portion of the return yoke layer exposed from the surface facing a recording medium. As a result, the magnetic flux density concentrated on the edge regions in the height direction is lowered, and it is possible to improve resistance to an external magnetic field. Therefore, it is preferable to provide the thick portions so as to be exposed from the surface facing a recording medium.

Figure 4A:
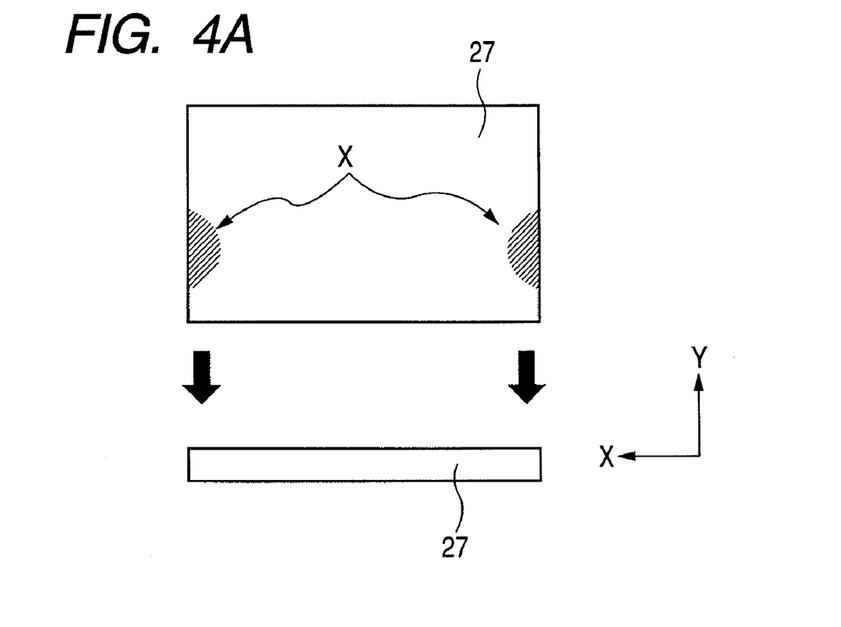
FIGS. 4A and 4B are diagrams illustrating the concentration of magnetic flux in the return yoke layer.

The return yoke layer 27 is generally formed of a substantially rectangular thin film magnetic body. When an external magnetic field is applied to the return yoke layer 27 in the height direction, the magnetic flux is concentrated on the edge of the thin film magnetic body as shown in FIG. 4A (in FIG. 4A, X indicates a magnetic flux concentrated portion). In this case, the number of magnetization components in the height direction is the largest, which causes the overwriting of information (edge write). Therefore, the inventors have paid attention to the magnetic field formed at the edge and developed a technique for increasing the volume of the vicinity of the edge, which is a magnetic field source, to lower the magnetic flux density in the vicinity of the edge, thereby weakening the magnetic field.

Figure 4B:
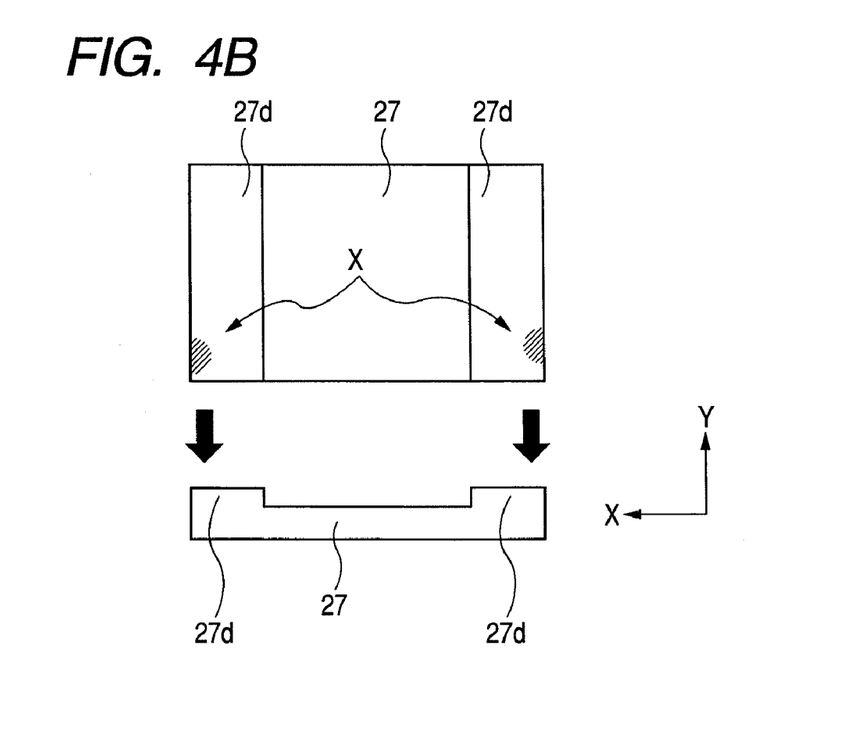

Therefore, in this embodiment, the return yoke layer is formed in a shape in which the volume of the edge region increases, that is, the edge region has a larger thickness than other regions. According to this structure, as shown in FIG. 4B, the magnetic field density in the vicinity of the edge region is lowered, and an edge write magnetic field is weakened. In this way, resistance to an external magnetic field is improved.

Next, an example for obtaining the effect of the invention will be described below.

Figure 5:
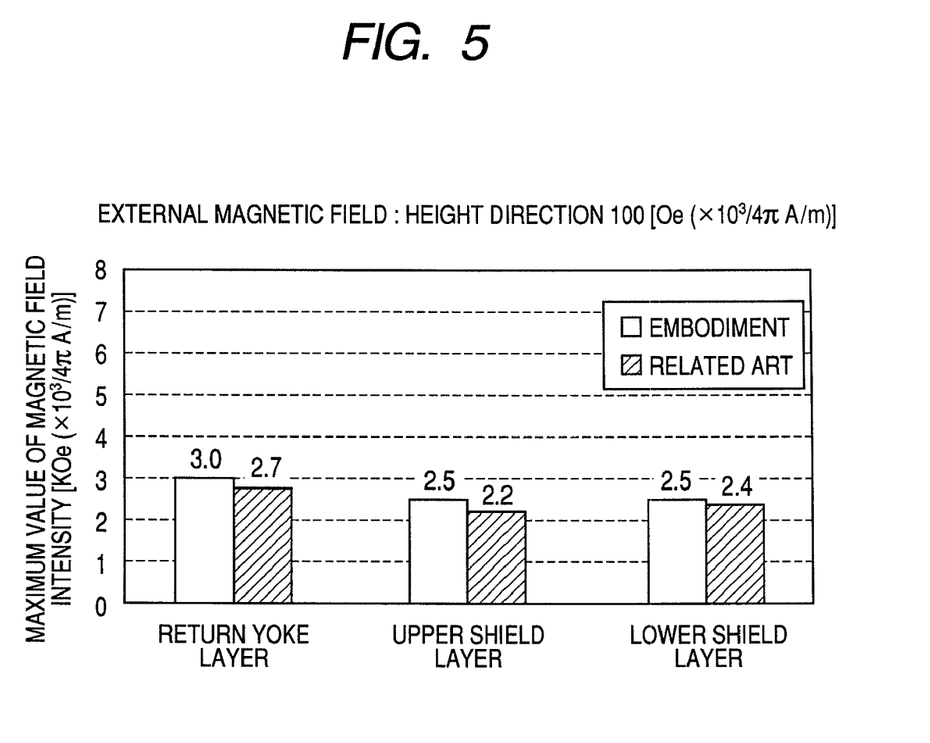
FIG. 5 is a diagram illustrating characteristics of the vertical magnetic recording head according to the embodiment.

In this example, a static magnetic field simulation is conducted to check the effects of the invention. In the simulation, the resistance of each portion of the vertical magnetic recording head to an external magnetic field is modeled, and magnetization states in the height direction and the track width direction are calculated when an external magnetic field (100 Oe ($\times 10^3/4\pi$ A/m)) is applied. In addition, the maximum magnetic field intensity means a maximum value in the intensity distribution of the magnetic field generated from the return yoke layer. Further, the magnetic field intensity in the height direction is measured at the center of the surface of a recording magnetic field. The maximum magnetic field intensity of a magnetic head provided with a vertical magnetic recording head in which the thick portions 27d in the edge regions of the return yoke layer have a thickness of 1.6 μm is measured. The measured results are shown in FIG. 5. In this case, the thick portions 27d have the shape shown in FIG. 3.

Furthermore, the maximum magnetic field intensity of a magnetic head provided with a vertical magnetic recording head in which the thick portions 27d in the edge regions of each of the upper shield layer 16 and the lower shield layer 13 have a thickness of 1.6 μm is measured in the height direction and the track width direction, using the same method as described above. The measured results are shown in FIG. 5. In addition, as a comparative example, the maximum magnetic field intensity (in the height direction) of a magnetic head provided with a vertical magnetic recording head in which a return yoke layer has a thickness of 0.5 μm is measured using the same method as described above. The measured results are shown in FIG. 5.

As can be seen from FIG. 5, since the magnetic head provided with the vertical magnetic recording head according to the example has thick portions in the vicinities of the edge regions, the maximum magnetic field intensity is lower than 3 kOe ($\times 10^3/4\pi$ A/m), and the edge write magnetic field is weakened. As a result, it is possible to improve resistance to the external magnetic field. Meanwhile, in the magnetic head provided with a vertical magnetic recording head in which the return yoke layer does not have the thick portions, the maximum magnetic field intensity is closed to 4 kOe, and edge write occurs due to the coercive force of a recording medium. In addition, the simulation proves that a magnetic head provided with a vertical magnetic recording head in which at least one of the return yoke layer 27, the upper shield layer 16, and the lower shield layer 13 has the thick portions 27d in the edge regions has good magnetic characteristics.

Figure 6:
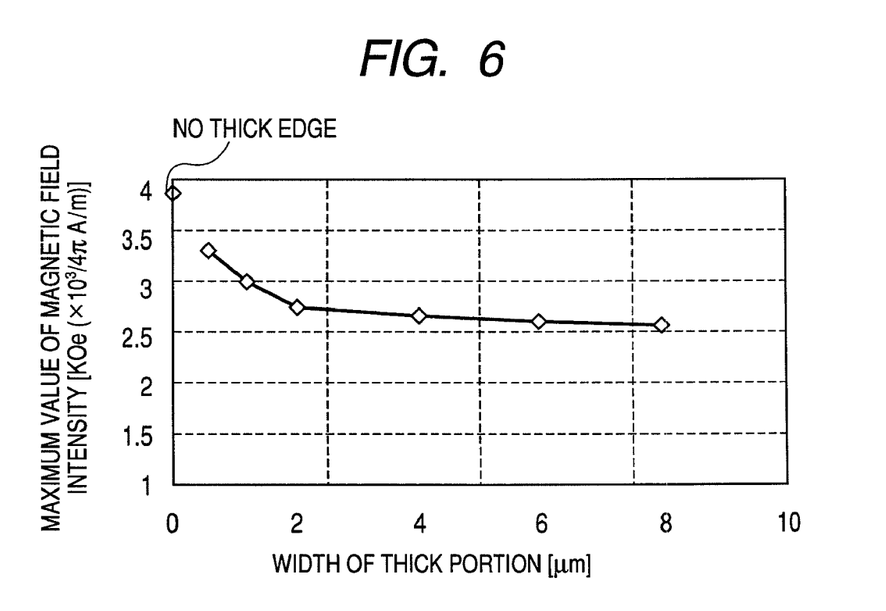
FIG. 6 is a diagram illustrating characteristics of the vertical magnetic recording head according to the embodiment.

Further, the maximum magnetic field intensity is calculated under the conditions that the thickness of the thick portion 27d is 1.6 μm and the width W of the thick portion 27d in the track width direction varies (0.5 μm, 1 μm, 2 μm, 4 μm, 6 μm, and 8 μm). The measured results are shown in FIG. 6. In addition, as a comparative example, the maximum magnetic field intensity of a magnetic head provided with a vertical magnetic recording head in which a return yoke layer has a thickness of 0.5 μm is measured by the same method as described above. The measured results are shown in FIG. 6.

As can be seen from FIG. 6, when the width W of the thick portion 27d is small, the maximum magnetic field intensity increases, and the maximum magnetic field intensity is saturated at a certain width. Therefore, it is preferable that the width W of the thick portion 27d be larger than 4 μm, as can be seen from FIG. 6.

Furthermore, from the viewpoint of PTP, a thermal analysis simulation is conducted on the magnetic head provided with the vertical magnetic recording head according to the disclosure to calculate the amount of protrusion of an element from the surface facing a recording medium due to heating. The amount of protrusion is measured in a central portion of the main magnetic pole layer in the track width direction and in the edge regions, that is, in the vicinities of the thick portions. In a magnetic head provided with a vertical magnetic recording head in which the return yoke layer includes the thick portions 27d having a thickness of 0.6 μm and the width W of the thick portion 27d in the track width direction varies (1 μm, 3 μm, 5 μm, 10 μm, 20 μm, and 28 μm), the amount of protrusion of an element due to heating is calculated. The results are shown in FIG. 7.

Figure 7:
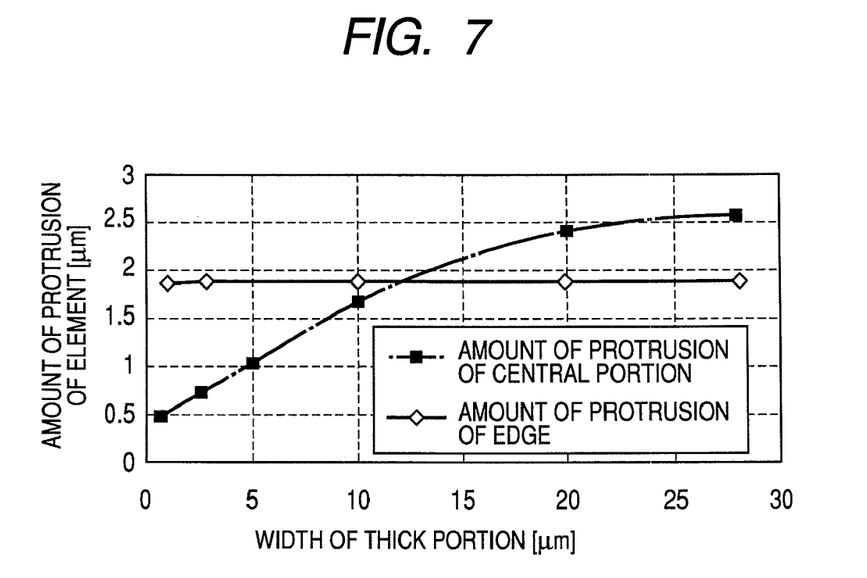
FIG. 7 is a diagram illustrating the relationship between the width of a thick portion and the amount of protrusion of an element.

As can be seen from FIG. 7, when the width W of the thick portion is large, the amount of protrusion of the edge region increases. Meanwhile, the amount of protrusion of the element in the central portion is constant regardless of the width of the thick portion in the track width direction. Therefore, the width W of the thick portion has little effect on the amount of protrusion of the element. In addition, in the magnetic head not including the thick portions, the amount of protrusion of a central portion in the track width direction is the largest, as can be seen from the graph of FIG. 7. Therefore, it is preferable that the width W of the thick portion be smaller than 10 μm at which the amount of protrusion of the edge region is smaller than the amount of protrusion of the central portion. From the results shown in FIGS. 6 and 7, it is preferable that the width W of the thick portion be in a range of about 4 μm to about 10 μm.

Next, a method of manufacturing a vertical magnetic recording head including the return yoke layer will be described below. FIGS. 8A to 8D are diagrams illustrating the method of manufacturing the vertical magnetic recording head device according to the invention. FIGS. 8A to 8D are diagrams as viewed from the surface facing a recording medium.

Figure 8A:
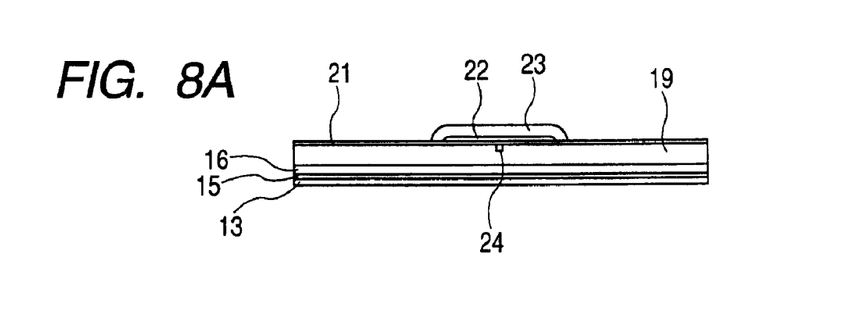
FIGS. 8A to 8D are diagrams illustrating a method of manufacturing the vertical magnetic recording head device according to the embodiment.

The non-magnetic insulating layer 12, the lower shield layer 13, the inorganic insulating layer 15, and the upper shield layer 16 are formed on the slider 10, and the insulating layer 19 including the main magnetic pole layer 24 is formed on the upper shield layer 16. Then, the gap layer 21 is formed on the insulating layer 19, and the gap layer 21 is patterned to form the coil insulating base layer 22. Then, the upper coil pieces 23 are formed on the coil insulating base layer 22. In this way, the structure shown in FIG. 8A is manufactured. In this case, general manufacturing conditions and materials may be used to manufacture the structure shown in FIG. 8A.

Figure 8B:
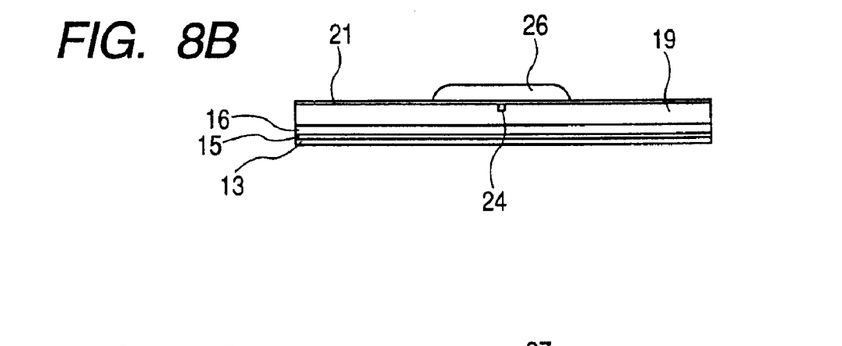

Then, as shown in FIG. 8B, the resist layer 26 is formed on the gap layer 21 including the coil insulating base layer 22 and the upper coil pieces 23. Specifically, a resist material is coated on the gap layer 21 including the coil insulating base layer 22 and the upper coil pieces 23, and a mask in which portions corresponding to the resist forming regions are opened is put on the resist material, and the register material is exposed and developed, thereby forming the resist layer 26.

Figure 8C:
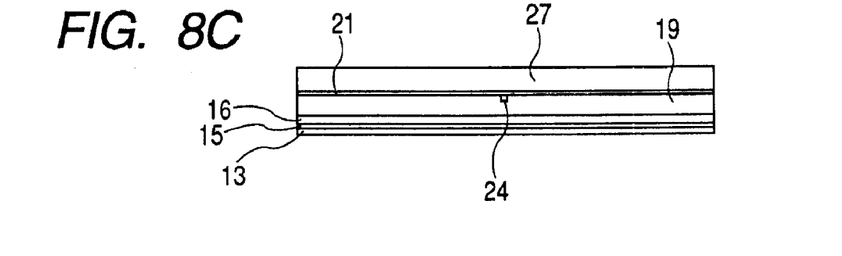
Figure 8D:
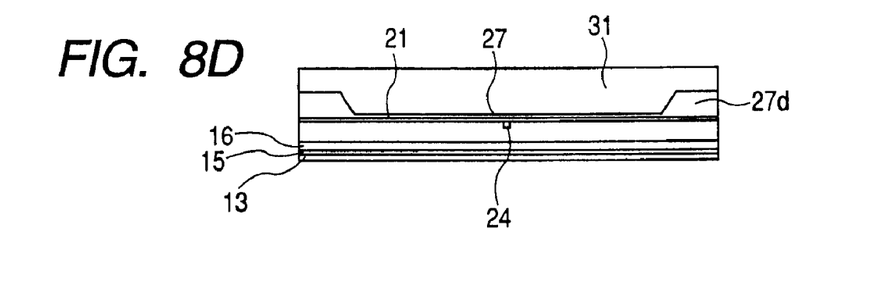

Then, as shown in FIG. 8C, the return yoke layer 27 is formed on the resist layer 26, which is the coil insulating layer. In this case, plating is performed on the resist layer 26 to form the return yoke layer 27. Subsequently, etching, such as ion milling, is performed on the return yoke layer 27 such that the thick portions 27d are formed in the edge portions of the return yoke layer 27. In this way, the thick portions 27d can be formed in the edge regions. Then, as shown in FIG. 8D, the insulating layer 31 is formed on the return yoke layer 27.

In this way, it is possible to manufacture a vertical magnetic recording head provided with the return yoke layer 27 having the thick portions 27d in the edge regions. In the vertical magnetic recording head, the thick portion 27d has a relatively large exposure area in the surface facing a recording medium. In the thick portions 27d, the magnetic field density in the vicinities of the edge regions are lowered, and the intensity of the magnetic field generated from the thick portions 27d is lowered. Therefore, even when the return yoke layer 27 has a relatively small thickness, it is possible to weaken an edge write magnetic field and thus improve resistance to the external magnetic field.

The invention is not limited to the above-described embodiment, but various modifications and changes of the invention can be made without departing from the scope and spirit of the invention. For example, the structure and shape of each layer of the vertical magnetic recording head are not particularly limited as long as thick portions are provided in edge regions of the shield layer as well as the return yoke layer. In addition, in the above-described embodiment, the thick portions are provided in the return yoke layer, but the invention is not limited thereto. The thick portions may be formed in the shield layer, for example, the upper shield layer or the lower shield layer, in addition to the return yoke layer. That is, when the thick portions are formed in the edge regions of the upper shield layer or the lower shield layer, it is possible to weaken the edge write magnetic field and thus improve resistance to the external magnetic field. Of course, the thick portions may be provided in the return yoke layer, the upper shield layer and/or the lower shield layer to weaken the edge write magnetic field and to improve resistance to the external magnetic field. In addition, the dimensions or materials used for the above-described embodiment are not particularly limited. Further, manufacturing processes are not limited to the above-described embodiment, but the order of the manufacturing processes may be appropriately changed. It will be understood by those skilled in the art that various modifications and changes of the invention can be made without departing from the scope of the invention.

The invention claimed is:

1. A vertical magnetic recording head device comprising:
   a first magnetic layer that includes a main magnetic pole exposed from a surface facing a recording medium;
   a second magnetic layer that is provided on the first magnetic layer with a non-magnetic layer interposed therebetween; and
   a coil layer that applies a recording magnetic field to the first magnetic layer,
   wherein the second magnetic layer includes thick portions that extend in a height direction in edge regions arranged in a track width direction, and the width of the thick portion in the track width direction is in a range of about 4 μm to about 10 μm.

2. The vertical magnetic recording head device according to claim 1, wherein the thick portions are provided at positions exposed from the surface facing the recording medium.

* * * * *